United States Patent
Yoshimura et al.

(10) Patent No.: US 11,036,564 B2
(45) Date of Patent: Jun. 15, 2021

(54) NON-TRANSITORY COMPUTER-READABLE STORAGE MEDIUM, INFORMATION PROCESSING APPARATUS AND METHOD FOR DETECTING MALWARE

(71) Applicant: FUJITSU LIMITED, Kanagawa (JP)

(72) Inventors: Kunihiko Yoshimura, Katsushika (JP); Toshitaka Satomi, Yamato (JP); Ryusuke Masuoka, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 67 days.

(21) Appl. No.: 15/844,189

(22) Filed: Dec. 15, 2017

(65) Prior Publication Data

US 2018/0189116 A1 Jul. 5, 2018

(30) Foreign Application Priority Data

Jan. 5, 2017 (JP) .............................. JP2017-000751

(51) Int. Cl.
*G06F 9/54* (2006.01)
*G06F 21/55* (2013.01)
(Continued)

(52) U.S. Cl.
CPC .............. *G06F 9/54* (2013.01); *G06F 21/552* (2013.01); *G06F 21/566* (2013.01); *G06F 11/3636* (2013.01); *G06F 2221/033* (2013.01)

(58) Field of Classification Search
None
See application file for complete search history.

(56) References Cited

U.S. PATENT DOCUMENTS 8,555,385 B1 * 10/2013 Bhatkar ................ G06F 21/556
726/22
8,806,641 B1 8/2014 Li et al.
(Continued)

FOREIGN PATENT DOCUMENTS

JP 2004-504662 A 2/2004
JP 2009-037545 2/2009
(Continued)

OTHER PUBLICATIONS

Cheng et al.; "An Information Retrieval Approach for Malware Classification Based on Windows API Calls"; 2013; Retrieved from the Internet https://ieeexplore.ieee.org/abstract/document/6890868; pp. 1-6, as printed. (Year: 2013).*

(Continued)

*Primary Examiner* — Michael W Chao
(74) *Attorney, Agent, or Firm* — Fujitsu Patent Center (57) ABSTRACT

A non-transitory computer-readable storage medium storing a program that causes an information processing apparatus to execute a process, the process includes executing a first program and a second program using a system including a kernel of an OS, acquiring first information regarding a first API call and second information regarding a second API call, executing a similarity judgment process in which a similarity between the first program and the second program is judged, wherein the first information is information indicating at least one of a type of the first API call, the number of executions of the first API call, and a call order of the first API call, the second information includes at least one of a type of the second API call, the second information includes the number of executions of the second API call, and a call order of the second API cal.

9 Claims, 8 Drawing Sheets

(51) Int. Cl.
*G06F 21/56* (2013.01)
*G06F 11/36* (2006.01)

(56) References Cited

U.S. PATENT DOCUMENTS

| | | | |
|---|---|---|---|
| 8,930,916 B1* | 1/2015 | Soeder | G06F 8/53 |
| | | | 717/133 |
| 9,021,589 B2* | 4/2015 | Anderson | G06F 21/566 |
| | | | 709/206 |
| 9,558,348 B1* | 1/2017 | Muttik | G06F 21/56 |
| 9,652,616 B1* | 5/2017 | Bhatkar | G06F 21/566 |
| 9,804,952 B1* | 10/2017 | Cohen | G06F 11/3644 |
| 9,917,855 B1* | 3/2018 | Li | G06F 21/566 |
| 10,200,390 B2* | 2/2019 | Rostami-Hesarsorkh | H04L 63/1425 |
| 10,230,749 B1* | 3/2019 | Rostami-Hesarsorkh | H04L 63/1425 |
| 10,645,099 B1* | 5/2020 | Ciubotariu | H04L 63/145 |
| 10,666,677 B2* | 5/2020 | Casey | H04L 9/3271 |
| 2003/0233574 A1 | 12/2003 | Kouznetsov et al. | |
| 2004/0268315 A1* | 12/2004 | Gouriou | G06F 11/362 |
| | | | 717/129 |
| 2004/0268317 A1* | 12/2004 | Gouriou | G06F 9/4843 |
| | | | 717/130 |
| 2005/0246688 A1* | 11/2005 | Gupta | G06F 11/3636 |
| | | | 717/124 |
| 2005/0257266 A1* | 11/2005 | Cook | G06F 8/61 |
| | | | 726/23 |
| 2005/0268338 A1 | 12/2005 | van der Made | |
| 2005/0273858 A1* | 12/2005 | Zadok | G06F 21/50 |
| | | | 726/24 |
| 2006/0005085 A1* | 1/2006 | Zunino | G06F 11/3495 |
| | | | 714/38.11 |
| 2006/0161985 A1 | 7/2006 | Zhao | |
| 2007/0240217 A1 | 10/2007 | Tuvell et al. | |
| 2007/0240222 A1 | 10/2007 | Tuvell et al. | |
| 2009/0254992 A1 | 10/2009 | Schultz et al. | |
| 2010/0310150 A1 | 12/2010 | Hayashi et al. | |
| 2011/0041179 A1 | 2/2011 | Stahlberg | |
| 2012/0102569 A1 | 4/2012 | Turbin | |
| 2012/0324575 A1* | 12/2012 | Choi | G06F 21/554 |
| | | | 726/23 |
| 2015/0082441 A1* | 3/2015 | Gathala | H04L 63/1441 |
| | | | 726/25 |
| 2015/0106931 A1 | 4/2015 | Mankin et al. | |
| 2015/0205962 A1* | 7/2015 | Swidowski | G06F 21/566 |
| | | | 726/23 |
| 2015/0264062 A1* | 9/2015 | Hagiwara | G06F 21/56 |
| | | | 726/24 |
| 2016/0072833 A1* | 3/2016 | Kim | G06F 16/334 |
| | | | 726/23 |
| 2016/0094564 A1 | 3/2016 | Mohandas et al. | |
| 2016/0224791 A1 | 8/2016 | Yamamoto et al. | |
| 2016/0292417 A1* | 10/2016 | Malik | G06F 21/566 |
| 2016/0379136 A1* | 12/2016 | Chen | G06F 21/552 |
| | | | 706/12 |
| 2017/0251003 A1* | 8/2017 | Rostami-Hesarsorkh | H04L 63/1425 |
| 2017/0300691 A1 | 10/2017 | Upchurch | |
| 2017/0308701 A1* | 10/2017 | Nandha Premnath | G06F 21/53 |
| 2017/0337371 A1* | 11/2017 | Amrilloev | G06F 21/56 |
| 2018/0121652 A1 | 5/2018 | Wang et al. | |
| 2018/0189490 A1* | 7/2018 | Maciejak | G06F 21/566 |
| 2018/0300474 A1* | 10/2018 | Yamada | G06F 21/53 |
| 2019/0303584 A1* | 10/2019 | Yang | G06F 21/577 |
| 2020/0026854 A1* | 1/2020 | Guo | G06F 21/564 |
| 2020/0175166 A1* | 6/2020 | Zhang | H04L 63/145 |

FOREIGN PATENT DOCUMENTS

| | | |
|---|---|---|
| JP | 2010-009269 A | 1/2010 |
| JP | 2011-258019 A | 12/2011 |
| JP | 2012-083798 | 4/2012 |
| JP | 2013-543624 A | 12/2013 |
| JP | 2015-79504 A | 4/2015 |
| JP | 2016-38721 A | 3/2016 |
| JP | 2016-099857 A | 5/2016 |
| JP | 2016-206950 A | 12/2016 |
| WO | 2009/072458 A1 | 6/2009 |
| WO | 2015/045043 A1 | 4/2015 |
| WO | 2016/090289 A1 | 6/2016 |

OTHER PUBLICATIONS

Soeder et al.,; Advanced Return Address Discovery using Context-Aware Machine Code Emulation; 2004; retrieved from the Internet www.blackhat.com/presentations/bh-usa-04/bh-us-04-soeder/bh-us-04-soeder-up.ppt; pp. 1-38, as printed. (Year: 2004).*

Wagner, Cynthia et al., "Malware analysis with graph kernels and support vector machines", Malicious and Unwanted Software (MALWARE), 2009 4th International Conference on, IEEE, Oct. 13, 2009, pp. 63-68, XP031622253.

Hegedus, Jozsef et al., "Methodology for Behavioral-based Malware Analysis and Detection using Random Projections and K-Nearest Neighbors Classifiers", 2011 Seventh International Conference on Computational Intelligence and Security, IEEE, Dec. 3, 2011, pp. 1016-1023, XP032094549.

Lin,Ying-Dar et al., "Three-Phase Detection and Classification for Android Malware Based on Common Behaviors", Journal of Communications Software and Systems, vol. 12, No. 3, Sep. 3, 2016, pp. 157-165, XP055472014.

Extended European Search Report dated May 9, 2018 for corresponding European Patent Application No. 17208414.7, 9 pages.

European Office Action dated Jun. 5, 2019 for corresponding European Patent Application No. 17208414.7, 9 pages.

Extended European Search Report dated May 8, 2018 for corresponding European Patent Application No. 17208412.1, 8 pages.

Wijnands, Krijn, "Detecting malware using process tree and process activity data", Feb. 1, 2016, pp. 1-5, XP055471049, Retrieved from the Internet: URL:scientific paper kjwijnands.pdf[retrieved on Apr. 26, 2018].

Anonymous, "Jaccard index—Wikipedia", Dec. 13, 2016, pp. 1-6, XP055470146, Retrieved from the Internet: URL:https://en.wikipedia.org/w/index.php?title=Jaccard index&oldid=754661103 [retrieved on Apr. 24, 2018].

U.S. Office Action dated Oct. 15, 2019 for copending U.S. Appl. No. 15/843,975, 20 pages.

U.S. Office Action dated Mar. 6, 2020 for copending U.S. Appl. No. 15/841,466, 24 pages.

European Office Action dated May 17, 2019 for corresponding European Patent Application No. 17207642.4, 8 pages.

Cheng, Julia Yu-Chin et al., "An information retrieval approach for malware classification based on Windows API calls," 2013 International Conference on Machine Learning and Cybernetics, Tianjin, 2013, pp. 1678-1683. (Year: 2013).

Qiao,Yong et al., "Analyzing Malware by Abstracting the Frequent Itemsets in API call Sequences", 2013 12th IEEE International Conference on Trust, Security and Privacy in Computing and Communications, IEEE, Jul. 16, 2013, pp. 265-270, XP032529512.

Trinius, Philipp et al., "A Malware Instruction Set for Behavior-Based Analysis", Retrieved from the Internet:URL: http:lleprints.pascal-network.org/archive/00007694/01/2010-sicherheitpdf, Dec. 31, 2011, 11 pages, XP055156320.

Shankarapani, Madhu K. et al., "Malware detection using assembly and API call sequences", Journal in Computer Virology, vol. 7, No. 2, Apr. 3, 2010, pp. 107-119, XP055472003.

Extended European Search Report dated May 23, 2018 for corresponding European Patent Application No. 17207642.4, 10 pages.

U.S. Office Action dated Aug. 22, 2019 for copending U.S. Appl. No. 15/841,466, 29 pages.

Hoshizawa, Yuji et al., "Automatic Malware Classification", Research Report of Information Processing Society, Information Processing Society of Japan, Jul. 20, 2007, vol. 2007, No. 71 (2007-CSEC-038), pp. 271-278, with English Translation and Japanese Written Submission of Publication.

(56) References Cited

OTHER PUBLICATIONS

Horiai, Keiichi et al., "Proposal and Implementation of Automated Malware Variant Classification Based on Dynamic Behavior", Journal of Information Processing Society [CD-ROM], Information Processing Society of Japan, Apr. 15, 2009, vol. 50, No. 4, pp. 1321-1333, with English Translation and Japanese Written Submission of Publication.

Nakamura et al., "Identification of Subspecific Malware by Utilizing Kullback-Leibler Divergences", Computer Security Symposium, 2013 collection of articles, Information Processing Society of Japan, Oct. 14, 2013, vol. 2013, No. 4, pp. 877-884, with English Translation and Japanese Written Submission of Publication.

Okubo, Ryo et al., "Function Estimation for Malwares Based on Part of Binary Code", Collection of Speech Articles at Forum of Information Science and Technology, Information Processing Society of Japan, Sep. 4, 2012, vol. 11, No. 4, pp. 191-196, with English Translation and Japanese Written Submission of Publication.

Fujino, Akinori et al., "Analysis of Massive Amount of API Call Logs Collected from Automated Dynamic Malware Analysis Systems", Computer Security Symposium, 2013 collection of articles, Information Processing Society of Japan, Oct. 14, 2013, vol. 2013, No. 4, pp. 618-625, with English Translation and Japanese Written Submission of Publication.

Usui et al., "Classification of Malicious Code Using Similarity Analysis of Machine Instruction Sequences", a Collection of Speech Articles at National Conference of Information Processing Society, Information Processing Society of Japan, Mar. 2, 2011, vol. 73rd, No. 3, pp. 3-489-3-490 with English Translation and Japanese Written Submission of Publication.

Japanese Written Submission of Publication dated Nov. 26, 2019 for corresponding Japanese Patent Application No. 2017-00748 with English Translation, 6 pages.

Japanese Written Submission of Publication dated Nov. 26, 2019 for corresponding Japanese Patent Application No. 2017-000751 with English Translation, 25 pages.

European Office Action dated Apr. 15, 2020 for corresponding European Patent Application No. 17208414.7, 9 pages.

U.S. Office Action dated Oct. 6, 2020 for copending U.S. Appl. No. 15/841,466, 23 pages.

Alazab, Manoun et al., "Malware Detection Based on Structural and Behavioural Features of API Calls", Edith Cowan University Research Online, International Cyber Resilience Conference, Conferences, Symposia and Campus Events, (Year: 2010), pp. 1-10.

Reick, Konrad et al., "Automatic Analysis of Malware Behavior using Machine Learning", Journal of Computer Security, vol. 19, No. 4, pp. 1-29, XP055539492.

European Office Action dated Apr. 15, 2020 for corresponding European Application No. 17208414.7, 9 pages.

Murakami, Junichi et al., "Improving accuracy of malware detection by filtering evaluation dataset based on its similarity", Computer Security symposium 2013, Information Processing Society of Japan, Oct. 14, 2013, IPSJ Symposium Series, vol. 2013, pp. 870-876.

Sato, Takumi et al., "Detectiong Malware Variants using Paragraph Vector", Computer Security Symposium 2016, Information Processing Society of Japan, Oct. 4, 2016, IPSJ, Symposium Series, vol. 2016, No. 2, pp. 298-304.

Japanese Office Action dated Jul. 28, 2020 for corresponding Japanese Patent Application No. 2017-000748 with English Translation, 10 pages.

Sato, Junko et al, "A Study of Characteristic of Malware Based on API Call Sequence and System Load Status Analysis", Computer Security symposium 2016, Information Processing Society of Japan, Oct. 4, 2016, IPSJ Symposium Series, vol. 2016, No. 2, pp. 305-309.

Japanese Office Action mailed of Japanese Patent Application No. 2017-000751 dated Jul. 28, 2020 with Machine Translation.

Rieck, Konrad et al., "Automatic Analysis of Malware Behavior using Machine Learning", Journal of Computer Security, vol. 19, No. 4, Jun. 20, 2011, pp. 1-29, XP055539492.

European Office Action dated Mar. 18, 2020 for corresponding European Patent Application No. 17207642.4, 9 pages.

Youngjoon, Ki et al., "A Novel Approach to Detect Maleware Based on API Call Sequence Analysis", International Journal of Distributed Sensor Networks, vol. 11, No. 6, Jun. 1, 2015, pp. 1-9, XP055471986.

European Office Action dated Oct. 27, 2020 for corresponding European Patent Application No. 17207642.4, 7 pages.

European Office Action dated Jan. 26, 2021 for corresponding European Patent Application No. 17208414.7, 11 pages.

Japanese Office Action dated Mar. 9, 2021 for corresponding Japanese Patent Application No. 2017-000751, with English Translation, 8 pages.

U.S. Office Action dated Mar. 29, 2021 for corresponding U.S. Appl. No. 15/841,466, 17 pages.

Upchurch, Jason et al., "First Byte: Force-Based Clustering of Filtered Block N-Grams to Detect Code Reuse in Malicious Software," pp. 68-76, 2013, 8th International Conference on Malicious and Unwanted Software: "The Americas" (MALWARE).

U.S. Office Action dated Apr. 5, 2021 for copending U.S. Appl. No. 15/841,466, 6 pages.

\* cited by examiner

XXXX.exe PID:1111, Parent PID:2222

| Timestamp | Thread | Function | Arguments | Status | Return |
|---|---|---|---|---|---|
| 10:57:43,805 | 2744 | Nt Open Directory Object | Directory Handle => 0x00000080<br>Desired Access => 15<br>Object Attributes =><br>C:¥Sessions¥1¥BaseNanedObjects | SUCCESS | 0x00000000 |
| 10:57:43,835 | 2744 | Nt Free Virtual Memory | Free Type => 0x00008000<br>Process Handle => 0xffffffff<br>Region Size => 0x00120000<br>Base Address => 0x01930000 | SUCCESS | 0x00000000 |
| 10:57:43,835 | 2744 | Ldr Get Dll Handle | Module Handle => 0x758a0000<br>File Name => kernel32.dll | SUCCESS | 0x00000000 |
| 10:57:43,835 | 2744 | Ldr Get Procedure Address | Ordinal => 0<br>Function Name =><br>Initialize Critical Section AndS<br>pin Count<br>Function Address => 0x758f3939<br>Module Handle => 0x758a0000 | SUCCESS | 0x00000000 |
| 10:57:43,835 | 2744 | Ldr Get Dll Handle | Module Handle => 0x758a0000<br>File Name => kernel32.dll | SUCCESS | 0x00000000 |
| 10:57:43,835 | 2744 | Ldr Get Procedure Address | Ordinal => 0<br>Function Name => FlsAlloc<br>Function Address => 0x758f418d<br>Module Handle => 0x758a0000 | SUCCESS | 0x00000000 |
| 10:57:43,835 | 2744 | Ldr Get Procedure Address | Ordinal => 0<br>Function Name => Fls Get Value<br>Function Address => 0x758f1e16<br>Module Handle => 0x758a0000 | SUCCESS | 0x00000000 |
| 10:57:43,835 | 2744 | Ldr Get Procedure Address | Ordinal => 0<br>Function Name => Fls Set Value<br>Function Address => 0x758f76e6<br>Module Handle => 0x758a0000 | SUCCESS | 0x00000000 |
| ... | ... | ... | ... | ... | ... |

FIG. 4

Library GXX32.dll
· 0x47d000 – Get Char XXX
· 0x47d004 – Get Character XXX

Library Sxx32.dll
· 0x47d1c8 – Command Line To ArgvW

⋮ yXXXX.exe PID: 3333, Parent PID: 2222
yXXXX.exe PID: 4444, Parent PID: 3333
iXXXX.exe PID: 5555, Parent PID: 4444
iXXXX.exe PID: 6666, Parent PID: 5555
sXXXX.exe PID: 7777, Parent PID: 6666
iXXXX.exe PID: 8888, Parent PID: 6666
rXXXX.exe PID: 9999, Parent PID: 6666

SCORE RESULT — 300

IDENTICAL FILES — 301

| No | Campaign | Filename (Sample Type) |
|---|---|---|
| 1 | undefined | iXXXX.exe (unknown) |
| 2 | undefined | iXXXX.exe (unknown) |

STATIC ANALYSIS RESULT — 302

| Rank | Score | Campaign | Filename (Sample Type) |
|---|---|---|---|
| 1 | 6 | campaign_117 | jt153c.exe (goodware) detail |
| 2 | 6 | campaign_206 | jt153c.exe (goodware) detail |
| 3 | 6 | campaign_229 | jt153c.exe ⋮ |

DYNAMIC ANALYSIS RESULT — 303

| Rank | Score | Campaign | Filename (Sample Type) |
|---|---|---|---|
| 1 | 56 | Campaign_117 | jt153c.exe (goodware) detail — 303c  src_dst_ip.score:6/7; query_domain. score:1/1; process_score:10/10; api.score:50/50; dll.score:0/50; — 303a |
| 3 | 56 | campaign_206 | jt153c.exe (goodware) ⋮ |

COSINE SIMILARITY — 304

| Rank | Score | Campaign | Filename (Sample Type) |
|---|---|---|---|
| 1 | 100 | Campaign_117 | jt153c.exe (goodware) detail — 304a  api_cosine_similarity.score:100/100, api_cosine_similarity(2-gram).score:100/100 — 303b |
| 3 | 100 | campaign_206 | jt153c.exe (goodware) ⋮ |

FIG. 8

NON-TRANSITORY COMPUTER-READABLE STORAGE MEDIUM, INFORMATION PROCESSING APPARATUS AND METHOD FOR DETECTING MALWARE

CROSS-REFERENCE TO RELATED APPLICATION

This application is based upon and claims the benefit of priority of the prior Japanese Patent Application No. 2017-000751, filed on Jan. 5, 2017, the entire contents of which are incorporated herein by reference.

FIELD

The embodiments discussed herein are related to a non-transitory computer-readable storage medium, an information processing apparatus and a method.

BACKGROUND

There are conventional methods of detecting malware such as a computer virus, a worm, spyware, and the like that may be illicitly infectious to a device. In one of malware detection methods, an equality or a similarity of a behavior in terms of network address scanning is compared between software that performs an illicit process and software under judgment. In another method, a code is summarized and checked in terms of the equality to a code of malware. A literature of related techniques can be found, for example, in Japanese Patent No. 5083760.

SUMMARY

According to an aspect of the invention, a non-transitory computer-readable storage medium storing a program that causes an information processing apparatus to execute a process, the process includes executing a first program using a system including a kernel of an operating system (OS), acquiring first information regarding a first Application Programming Interface (API) call in communication with the kernel in the execution of the first program, executing a second program using the system, acquiring second information regarding a second API call in communication with the kernel in the execution of the second program, executing a similarity judgment process in which a similarity between the first program and the second program is judged by comparing the acquired first information and the second information, and outputting the judged similarity, wherein the first information is information indicating at least one of a type of the first API call, the number of executions of the first API call, and a call order of the first API call, the second information includes a type of the second API call in a case where the first information includes the type of the first API call, the second information includes the number of executions of the second API call in a case where the first information includes the number of executions of the first API call, and the second information includes a call order of the second API call in case where the first information includes the call order of the first API call.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The conventional techniques described above have a problem that it is difficult to detect a lot of various subspecies of malware that may occur from one piece of malware. For example, subspecies of malware can be relatively easily created from original malware by changing a part, such as an attack target, of the original malware, and thus a lot of various subspecies of malware occur. These subspecies of malware are each different in terms of code and attack targets, and thus it is difficult to detect them by making a comparison with original malware in terms of code or a behavior associated with network address scanning. Furthermore, to detect these subspecies of malware, all subspecies of malware have to be collected, which is not easy to achieve.

In an aspect, it is an object to provide a similarity judgment program, a similarity judgment method, and an information processing apparatus, capable of easily detecting a lot of various subspecies of malware.

Referring to drawings, a similarity judgment program, a similarity judgment method, and an information processing apparatus according to embodiments are described below. In the embodiments, elements having the same functions are assigned the same symbols, and duplicated descriptions thereof are omitted. Note that the similarity judgment program, the similarity judgment method, and the information processing apparatus described below with reference to embodiments are given by way of example but not limitation. Also note that the embodiments described below may be properly combined as long as inconsistency occurs.

Figure 1:
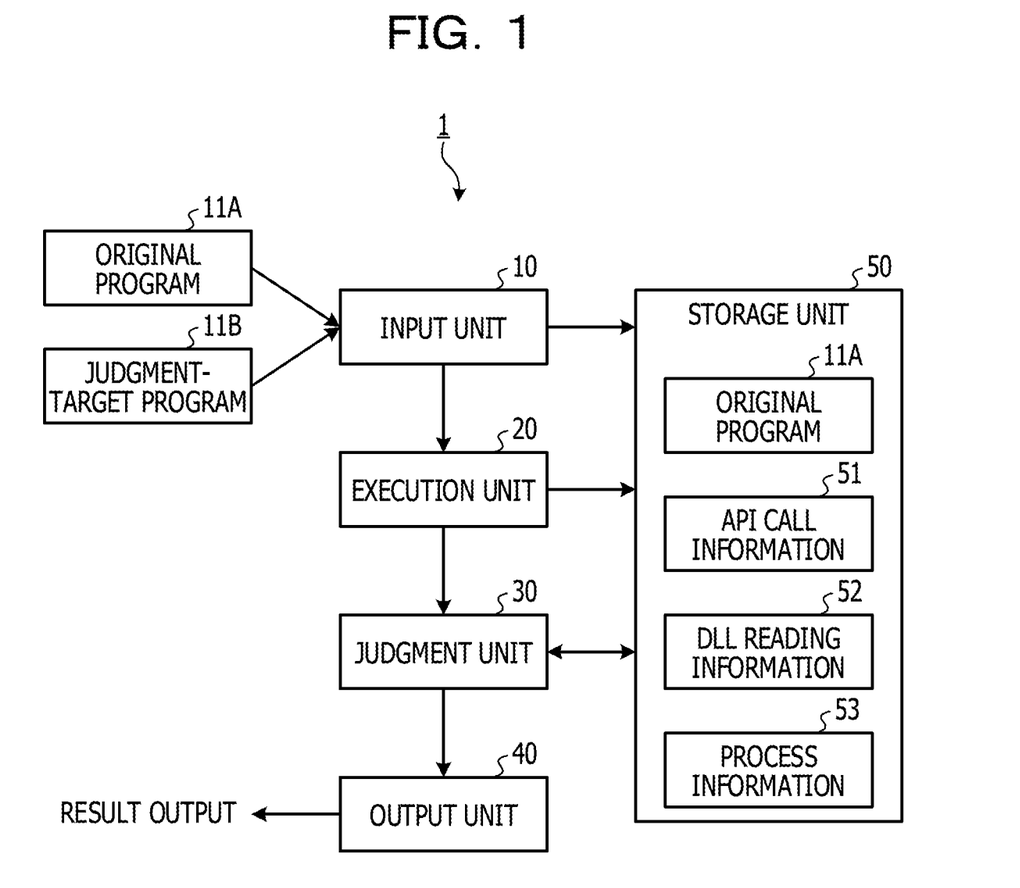
FIG. 1 is a block diagram illustrating an example of a functional configuration of an information processing apparatus according to an embodiment.

FIG. 1 is a block diagram illustrating an example of a functional configuration of an information processing apparatus according to an embodiment; As illustrated in FIG. 1, an information processing apparatus 1 is an apparatus configured to accept an input of an original program 11A that is software such as malware configured to perform an illicit process and that is to be used as a reference in checking. The information processing apparatus 1 also accepts an input of a judgment-target program 11B that is a program to be subjected to a judgment as to whether the program is malware or not. The information processing apparatus 1 compare the judgment-target program 11B and the original program 11A, and outputs a judgment result to a display or the like. As for the information processing apparatus 1, for example, a PC (Personal Computer) or the like may be used, and the information processing apparatus 1 includes an input unit 10, an execution unit 20, a judgment unit 30, an output unit 40, and a storage unit 50.

The input unit 10 accepts an input of data via reading the data from a storage medium such as a semiconductor memory, a DVD (Digital Versatile Disk), or the like or via communication using a communication network such as the Internet. More specifically, the input unit 10 accepts inputs of the original program 11A and the judgment-target program 11B. The original program 11A and the judgment-target program 11B are respectively examples of a first program and a second program. The input unit 10 outputs the accepted original program 11A and the accepted judgment-target program 11B to the execution unit 20. Furthermore, the input unit 10 stores the original program 11A in the storage unit 50.

The execution unit 20 is an example of an acquisition unit. The execution unit 20 executes the original program 11A and the judgment-target program 11B under a system environment of a particular OS (Operating System) and acquires various kinds of information in the execution.

Figure 2:
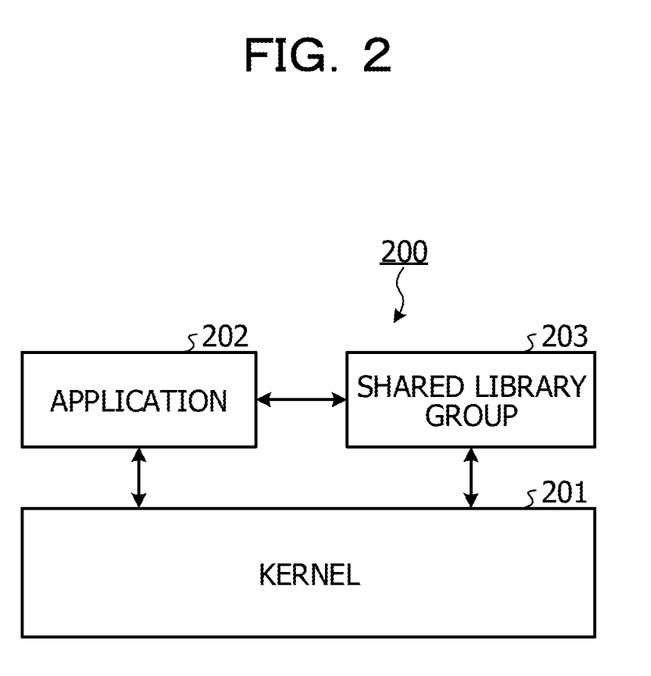
FIG. 2 is a diagram illustrating a system environment.

FIG. 2 is a diagram illustrating a system environment; As illustrated in FIG. 2, the system environment 200, which executes an application 202 such as the original program 11A, the judgment-target program 11B, or the like, includes a kernel 201 that is a core of the OS, and a shared library group 203 such as DLL (Dynamic Link Library). The system environment 200 is provided, for example, by an OS on the information processing apparatus 1 or an OS on a virtual machine realized in the information processing apparatus 1 using a virtual technique. Note that the OS may be of any type such as Linux (registered trademark), Windows (registered trademark), or the like.

The execution unit 20 monitors a system call during executing the application 202 such as the original program 11A, the judgment-target program 11B, or the like, and acquires API call information 51 such as the type of an API (Application Programming Interface) call called via a communication with the kernel 201, the number executions of the call, a calling order, or the like. The execution unit 20 stores, in the storage unit 50, the acquired API call information 51 together with identifiers (for example, program names) indicating the original program 11A and the judgment-target program 11B.

Figure 3:
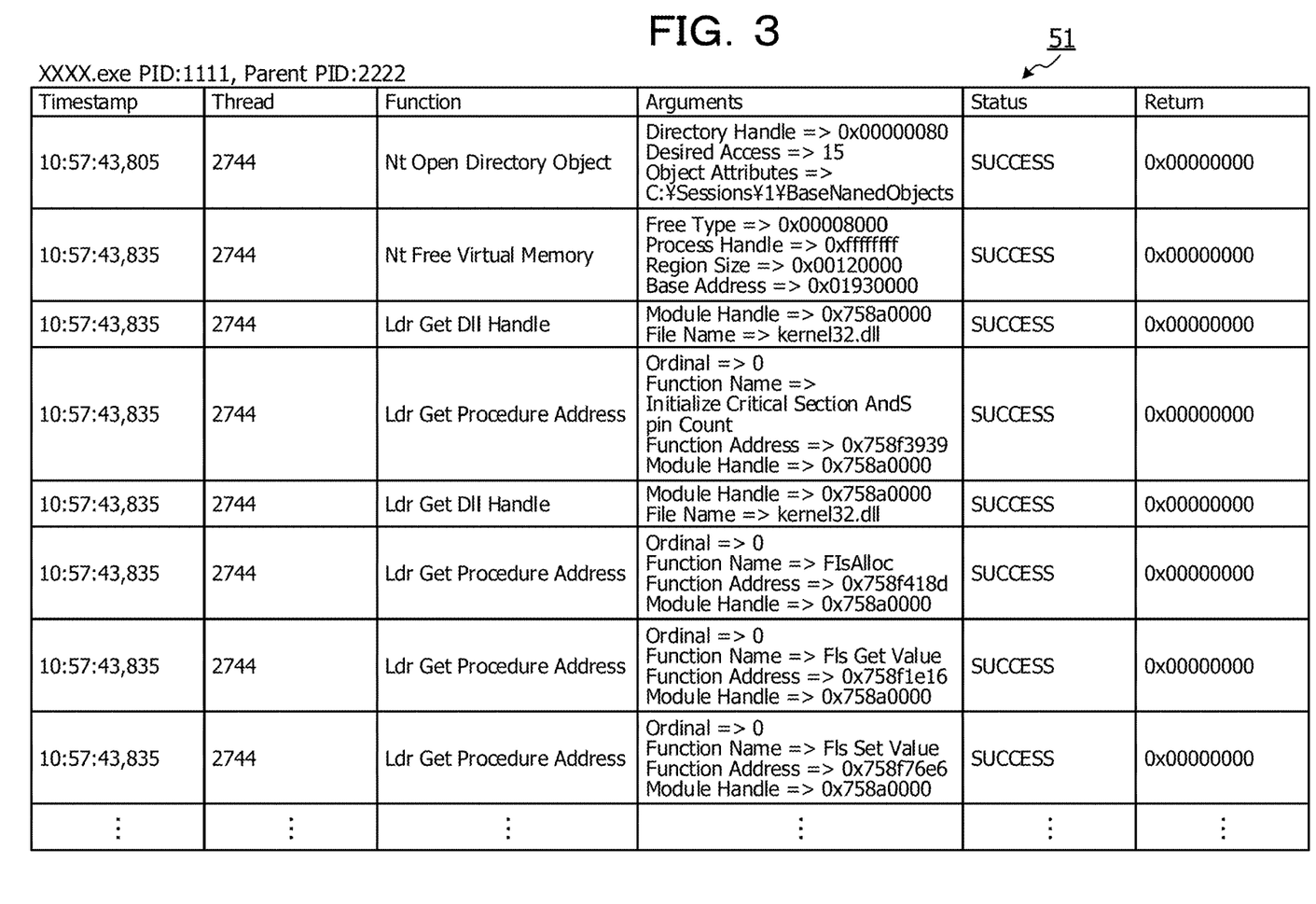
FIG. 3 is a diagram illustrating API call information.

FIG. 3 is a diagram illustrating the API call information 51. As illustrated in FIG. 3, the API call information 51 includes information associated with API calls in execution of the application 202 in terms of "Timestamp", "Thread", "Function", "Arguments", "Status", "Return", etc.

"Timestamp" indicates a time of an API call, that is, a call order. "Thread" indicates a thread of an API call, and the number of API calls for the same thread indicates the number of executions of the call. "Function" indicates a function called by an API call. "Arguments" indicates an argument of an API call. "Status" indicates a status (for example, in terms of success/failure) of an API call. "Return" indicates an address (a return value) to which an API call is to return.

The execution unit 20 also monitors reading of the shared library group 203 during the execution of the application 202 such as the original program 11A, the judgment-target program 11B, or the like, and the execution unit 20 acquires DLL reading information 52 regarding a file group of a shared library read out from the shared library group 203. The execution unit 20 stores, in the storage unit 50, the acquired DLL reading information 52 together with identifiers (for example, program names) indicating the input original program 11A and the judgment-target program 11B.

Figure 4:
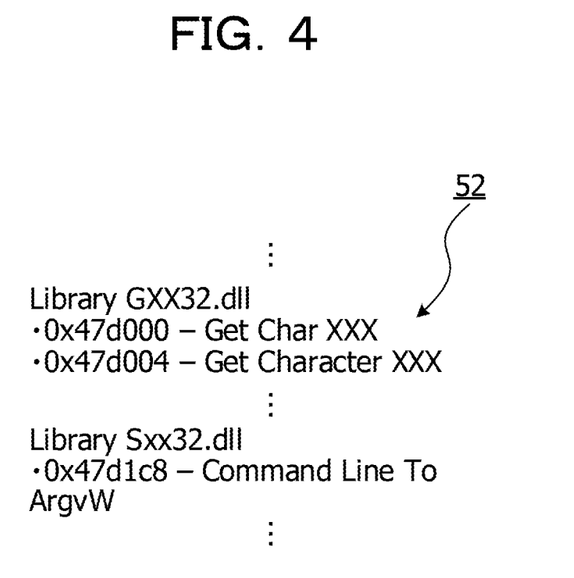
FIG. 4 is a diagram illustrating DLL reading information.

FIG. 4 is a diagram illustrating the DLL reading information 52. As illustrated in FIG. 4, the DLL reading information 52 is a list of a file group ("GXX32.dll", "Sxx32.dll", . . . etc.) read out from the shared library group 203 in the execution of the application 202.

The execution unit 20 also monitors a process during the execution of the application 202 such as the original program 11A, the judgment-target program 11B, or the like, and acquires process information 53 regarding the executed process. The execution unit 20 stores, in the storage unit 50, the acquired process information 53 together with identifiers (for example, program names) indicating the input original program 11A and the judgment-target program 11B.

Figure 5:
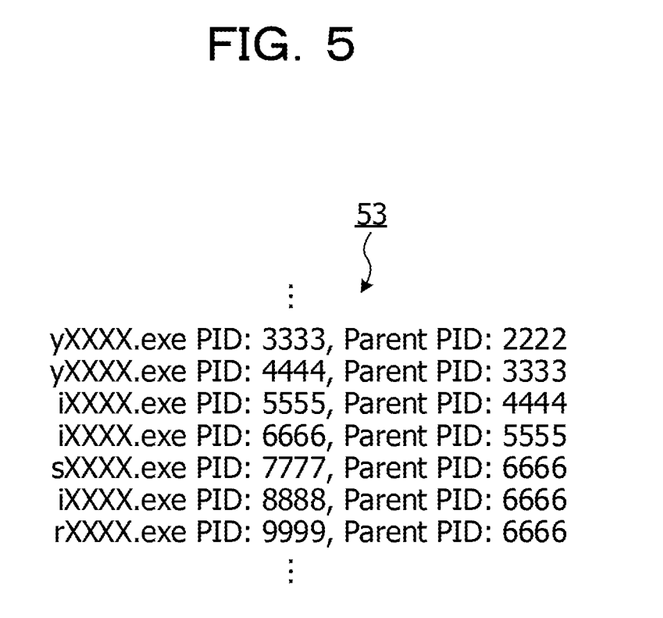
FIG. 5 is a diagram illustrating process information.

FIG. 5 is a diagram illustrating the process information 53. As illustrated in FIG. 5, the process information 53 is a list of processes in the execution of the application 202. More specifically, the process information 53 includes a process name (such as "yXXXX.exe") and a process ID (such as "PID: 3333") as process identifiers, and information indicating a parent process (such as "Parent PID: 2222") for each process in the execution.

The judgment unit 30 judges a similarity between the original program 11A and the judgment-target program 11B based on a result of a comparison between a code of the original program 11A and a code of the judgment-target program 11B or a comparison between information acquired in the execution of the original program 11A and information acquired in the execution of the judgment-target program 11B.

More specifically, the judgment unit 30 performs a static analysis to judge the similarity indicating the degree of similarity between codes by comparing the code of the original program 11A and the code of the judgment-target program 11B, and the judgment unit 30 outputs an analysis result to the output unit 40. The judgment unit 30 also performs a dynamic analysis to judge the similarity between the information acquired in the execution of the original program 11A and the information acquired in the execution of the judgment-target program 11B by comparing them, and the judgment unit 30 outputs an analysis result to the output unit 40.

More specifically, the judgment unit 30 compares an API call type, the number of executions of the API call, a call order of the API call, a timestamp of the API call, a thread of the API call, an argument of the API call, information indicating a result of the API call in terms of success/failure, or information indicating a return value of the API call included in the API call information 51 regarding the original program 11A with an API call type, the number of executions of the API call, a call order of the API call, a timestamp of the API call, a thread of the API call, an argument of the API call, information indicating a result of the API call in terms of success/failure, or information indicating a return value of the API call included in the API call information 51 regarding the judgment-target program 11B. The judgment unit 30 then calculates the similarity indicating the degree of similarity between the two pieces of information by performing scoring based on the equality/difference between the two pieces of information.

For example, a difference of subspecific malware from its original malware is limited to part of the malware such as an attack target, and thus a content of an API call is similar to that of the original malware. Therefore, by determining the similarity of the API call information 51 regarding the judgment-target program 11B with respect to the reference program, that is, the API call information 51 regarding the original program 11A, it is possible to easily detect a lot of various subspecies of malware that may occur from the original program 11A. For example, in a case where there is a high similarity (for example, higher than a predetermined value) between the API call information 51 regarding the judgment-target program 11B and the API call information 51 regarding the original program 11A which is the reference program, it can be determined that the judgment-target program 11B is malware.

Furthermore, the judgment unit 30 generates summary information indicating a result of summarizing features of part of all of the API call type, the number of executions of the API call, the call order of the API call, the timestamp of the API call, the thread of the API call, the argument of the API call, the information indicating a result of the API call in terms of success/failure, and the return value of the API call included in the API call information 51 regarding the plurality of original programs 11A. More specifically, the summary information may be given by TF (Term Frequency)/IDF (Inverse Document Frequency) or contrast set mining obtained by an aggregation of a frequency of occurrence of a feature in a program or a frequency of occurrence of a feature over a plurality of programs.

The judgment unit 30 compares TF/IDF obtained by the aggregation from the API call information 51 regarding the plurality of original programs 11A with information included in the API call information 51 regarding the judgment-target program 11B, and outputs the similarity between the plurality of original programs 11A and the judgment-target program 11B. The TF/IDF aggregated from the API call information 51 regarding the plurality of original programs 11A indicates a feature specific to malware. Therefore, based on the comparison with TF/IDF aggregated from the API call information 51 regarding the plurality of original programs 11A, it is possible to calculate the similarity in which the feature specific to the malware is emphasized.

Furthermore, the judgment unit 30 compares the DLL reading information 52 regarding the judgment-target program 11B with the DLL reading information 52 regarding the original program 11A and performs scoring based on equality/difference between these pieces of information thereby calculating the similarity indicating the degree of similarity between these pieces of information.

For example, a file of a shared library read out by the original malware and a file of a shared library read out by subspecific malware are similar to each other. Therefore, by determining the similarity between the DLL reading information 52 regarding the judgment-target program 11B and the DLL reading information 52 regarding the original program 11A which the reference program, it is possible to easily detect a lot of various subspecies of malware that may occur from the original program 11A. For example, in a case where there is a high similarity (for example, higher than a predetermined value) between the DLL reading information 52 regarding the judgment-target program 11B and the DLL reading information 52 regarding the original program 11A which is the reference program, it can be determined that the judgment-target program 11B is malware.

Furthermore, the judgment unit 30 compares the process information 53 regarding the judgment-target program 11B with the process information 53 regarding the original program 11A and performs scoring based on equality/difference between these pieces of information thereby calculating the similarity indicating the degree of similarity between these pieces of information.

For example, a process executed by the original malware and a process executed by subspecific malware are similar to each other. Therefore, by determining the similarity between the process information 53 regarding the judgment-target program 11B and the process information 53 regarding the original program 11A which is the reference program, it is possible to easily detect a lot of various subspecies of malware that may occur from the original program 11A. For example, in a case where there is a high similarity (for example, higher than a predetermined value) between the process information 53 regarding the judgment-target program 11B and the process information 53 regarding the original program 11A which is the reference program, it can be determined that the judgment-target program 11B is malware.

The output unit 40 outputs the similarity, judged by the judgment unit 30, between the original program 11A and the judgment-target program 11B to a display, a file, or the like. A user is allowed to determine whether the judgment-target program 11B is malware or not by checking the output similarity.

The output unit 40 ranks the original programs 11A in the descending order of the similarity (the score) based on a result of the comparison of the plurality of original programs 11A with the judgment-target program 11B. Thereafter, the output unit 40 sorts the original programs 11A in the descending order of the score, and displays the judged score indicating the similarity with respect to the judgment-target program 11B for each original program 11A. This makes it possible for a user to easily find an original program 11A having a high similarity to the judgment-target program 11B from the plurality of original programs 11A.

Furthermore, the output unit 40 ranks judgment-target programs 11B in descending order of similarity (score) based on results of comparisons of a plurality of judgment-target programs 11B with the original program 11A. The output unit 40 then sorts the judgment-target programs 11B in descending order of score, and displays scores indicating similarities determined for the respective judgment-target programs 11B with respect to the original program 11A. This allows a user to easily find a judgment-target program 11B with a high similarity with the original program 11A from a plurality of judgment-target programs 11B. In the present embodiment, by way of example, based on results of comparisons of a plurality of original programs 11A with the judgment-target program 11B, the original programs 11A are sorted in the order of score and displayed.

The storage unit 50 is a storage apparatus such as an HDD (Hard Disk Drive). The storage unit 50 stores the original program 11A that is the reference program and the API call information 51, the DLL reading information 52, and the process information 53 regarding each program.

Figure 6:
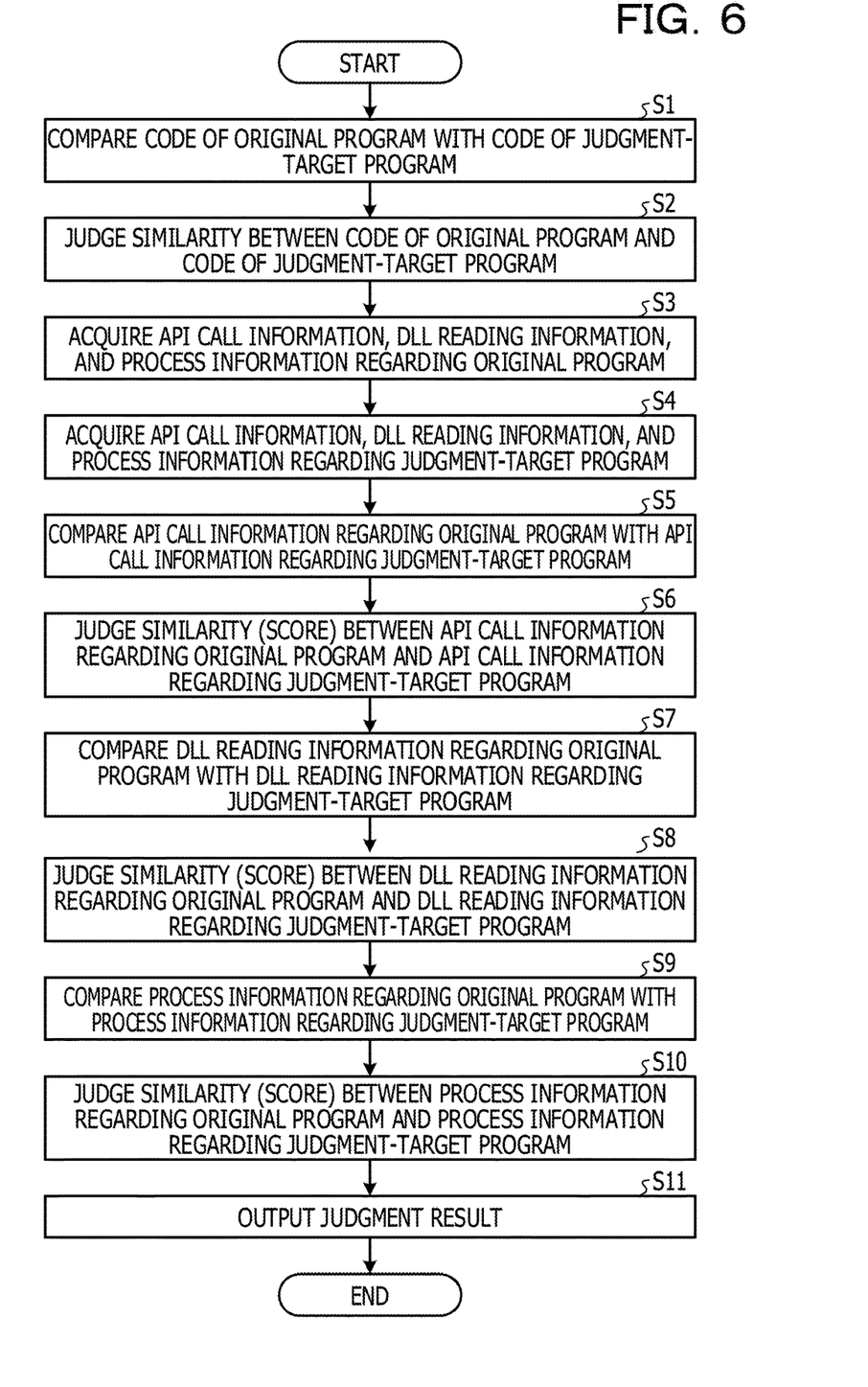
FIG. 6 is a flow chart illustrating an example of an operation of an information processing apparatus according to an embodiment.

FIG. 6 is a flow chart illustrating an example of an operation of the information processing apparatus 1 according to the embodiment. Note that it is assumed that the original program 11A has been input before the process is started, and the original program 11A and the API call information 51, the DLL reading information 52, and the process information 53 regarding the original program 11A have already been stored (acquired) in the storage unit 50. On the other hand, the judgment-target program 11B is input when the process is started.

As illustrated in FIG. 6, when the process is started, the judgment unit 30 reads out the original program 11A from the storage unit 50 and compares the code of the input judgment-target program 11B with the code of the read-out original program 11A by using a difference tool (for example, Diff) (S1).

Thereafter, based on a result of the comparison in S1, the judgment unit 30 determines the similarity between the code of the judgment-target program 11B and the code of the original program 11A (S2). More specifically, the judgment unit 30 determines a score indicating the similarity between the codes based on the amount of difference detected by the difference tool.

Thereafter, the judgment unit 30 acquires the API call information 51, the DLL reading information 52, and the process information 53 regarding the original program 11A stored in the storage unit 50 (S3).

Thereafter, the execution unit 20 executes the input judgment-target program 11B and acquires the API call information 51, the DLL reading information 52, and the process information 53 regarding the judgment-target program 11B (S4). The execution unit 20 stores the acquired API call information 51, the DLL reading information 52, and the process information 53 regarding the judgment-target program 11B in the storage unit 50 and also outputs them to the judgment unit 30.

Thereafter, the judgment unit 30 compares the API call information 51 regarding the judgment-target program 11B with the API call information 51 regarding the original program 11A (S5). Thereafter, the judgment unit 30 performs scoring based on equality/difference between these pieces of information and thereby judges the similarity (the score) between the API call information 51 regarding the judgment-target program 11B and the API call information 51 regarding the original program 11A (S6).

In the judgment as to the similarity in S6, the similarity degree between an N-gram model of the API call information 51 regarding the judgment-target program 11B and an N-gram model of the API call information 51 regarding the original program 11A may be determined as the score.

More specifically, based on the API call information 51 regarding the original program 11A, the judgment unit 30 determines information indicating the order of occurrence of API calls (for example, obtained by sorting according to "Timestamp" in FIG. 3). Thereafter, the judgment unit 30 determines a frequency of occurrence indicating a frequency of occurrence of combinations of N API calls, sequentially for each combination, thereby obtaining an N-gram model based on the API call information 51 regarding the original program 11A.

Similarly, based on the API call information 51 regarding the judgment-target program 11B, the judgment unit 30 determines information indicating the order of occurrence of API calls. Thereafter, the judgment unit 30 determines a frequency of occurrence indicating a frequency of occurrence of combinations of N API calls, sequentially for each combination, thereby obtaining an N-gram model based on the API call information 51 regarding the judgment-target program 11B. Thereafter, the judgment unit 30 determines the similarity by calculating the score indicating the similarity degree between the two N-gram models. As described above, by determining the similarity between the N-gram model of the API call information 51 regarding the judgment-target program 11B and the N-gram model of the API call information 51 regarding the original program 11A, it is possible to obtain the similarity taking into account the call order of the API calls.

In the judgment as to the similarity in S6, the score may be given by an angle, a linear distance, or a cosine similarity, in a vector space, between a vector based on the API call information 51 regarding the original program 11A and a vector based on the judgment-target program 11B. More specifically, the judgment unit 30 determines a vector including, as components, the API call type, the number of executions of the API call, the call order of the API call, etc. included in the API call information 51 regarding the original program 11A. Furthermore, the judgment unit 30 determines a vector including, as components, the API call type, the number of executions of the API call, the call order of the API call, etc. included in the API call information 51 regarding the judgment-target program 11B. The judgment unit 30 then determines an angle between the two vectors, a linear distance between tails of the two vectors, or a cosine similarity of the two vectors in the vector space under the condition that the tips of the two vectors are put such that they overlap each other. As described above, the judgment unit 30 may determine the score based on the angle, the linear distance, or the cosine similarity, in the vector space, between the vector based on the API call information 51 regarding the original program 11A and the vector based on the judgment-target program 11B.

Thereafter, the judgment unit 30 compares the DLL reading information 52 regarding the judgment-target program 11B with the DLL reading information 52 regarding the original program 11A (S7). Thereafter, the judgment unit 30 performs scoring based on the equality/difference between the pieces of information, and thereby judges the similarity (the score) between the DLL reading information 52 regarding the judgment-target program 11B and the DLL reading information 52 regarding the original program 11A (S8).

In the judgment as to the similarity in S8, a set including as elements files included in the DLL reading information 52 regarding the judgment-target program 11B is compared with a set including as elements files included in the DLL reading information 52 regarding the original program 11A, and a Jaccard index indicating the similarity between the sets may be employed as the score. More specifically, the judgment unit 30 determines the Jaccard index whose denominator is given by the number of elements included in a result of an OR operation between the two sets and whose numerator is given by the number of elements included in a result of an AND operation between the two sets. As described above, the judgment unit 30 may determine the similarity degree between the set of files called from the shared library group 203 by the original program 11A and the set of files called from the shared library group 203 by the judgment-target program 11B.

Thereafter, the judgment unit 30 compares the process information 53 regarding the judgment-target program 11B with the process information 53 regarding the original program 11A (S9). Thereafter, the judgment unit 30 performs scoring based on equality/difference between these pieces of information and thereby judges the similarity (the score) between the process information 53 regarding the judgment-target program 11B and the process information 53 regarding the original program 11A (S10).

In the judgment as to the similarity in S10, a set including as elements processes included in the process information 53 regarding the judgment-target program 11B may be compared with a set including as elements processes included in the process information 53 regarding the original program 11A, and a Jaccard index indicating the similarity between the sets may be employed as the score. As described above, the judgment unit 30 may determine the similarity degree between a set of processes executed by the judgment-target program 11B and a set of processes executed by the original program 11A.

Thereafter, the output unit 40 outputs the result of the judgment made by the judgment unit 30 in S2, S6, S8, and S10, that is, the similarity between the judgment-target program 11B and the original program 11A to a display or a file (S11).

Figure 7:
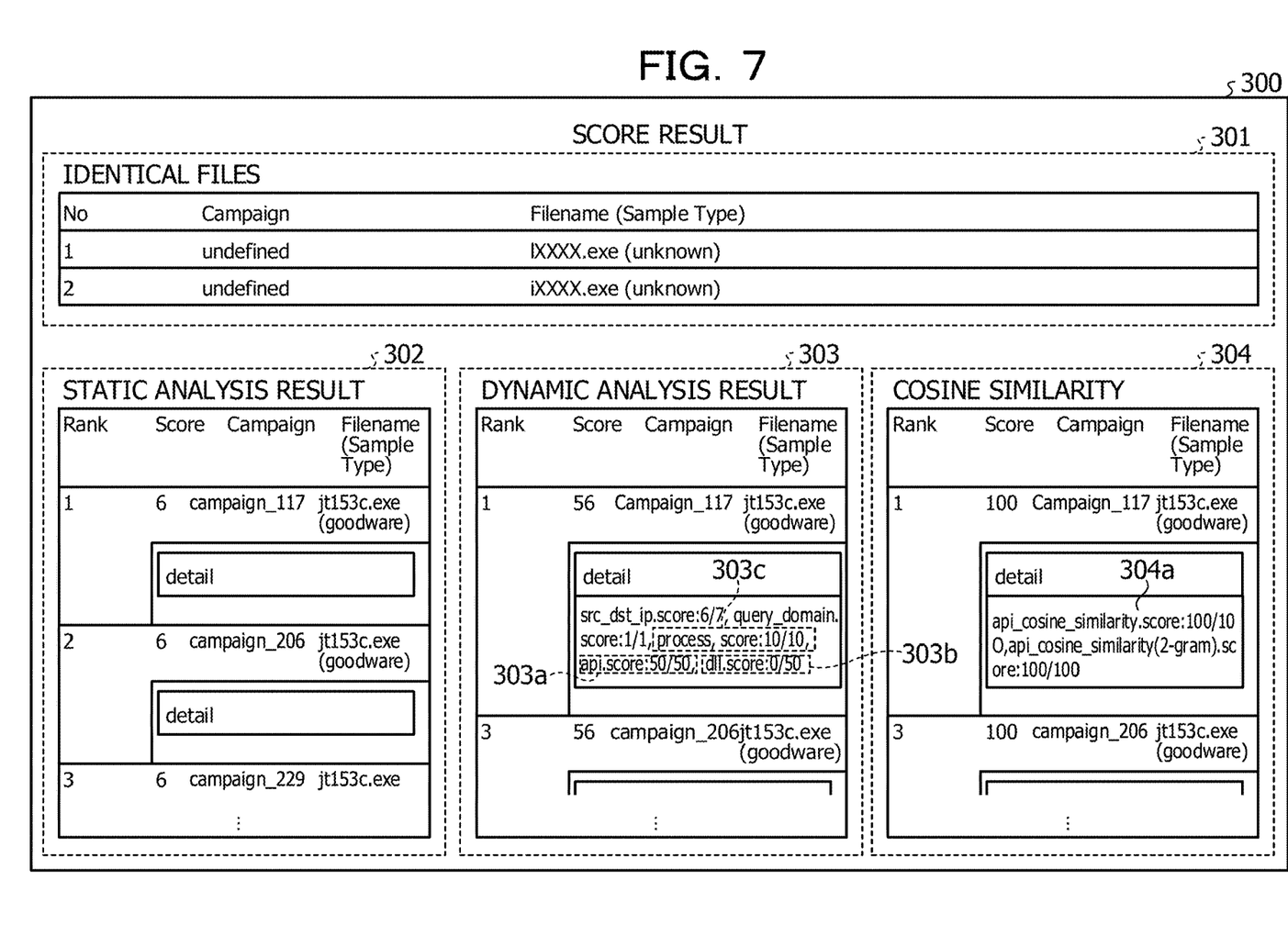
FIG. 7 is a diagram illustrating a result output.

FIG. 7 is a diagram illustrating a result output. As illustrated in FIG. 7, the output unit 40 displays, on a display screen 300, the result of the judgment made by the judgment unit 30 in S2, S6, S8, and S10. This makes it possible for a user to determine whether the judgment-target program 11B is malware or not.

More specifically, the display screen 300 includes a file display area 301 and result display areas 302 to 304. The file display area 301 is an area in which a list of original programs 11A is displayed in the descending order of the similarity (the score) according to a result of comparison between the judgment-target program 11B and the plurality of original programs 11A. This file display area 301 allows a user to easily find original programs 11A with high similarities with respect to the judgment-target program 11B.

The result display area 302 is an area in which a result of static analysis is displayed as to the similarity degree between the code of the judgment-target program 11B and codes of original programs 11A. This result display area 302 allows a user to easily know the similarity degree of the code between the original program 11A and the judgment-target program 11B.

The result display area 303 is an area in which a result is displayed as to dynamic analysis based on a comparison between original programs 11A in execution and the judgment-target program 11B in execution. More specifically, the result display area 303 includes a score 303a based on the comparison between the API call information 51 regarding the original program 11A and the API call information 51 regarding the judgment-target program 11B. This score 303a allows a user to easily know the similarity degree between the content of the API call in the execution of the original program 11A and the content of the API call in the execution of the judgment-target program 11B.

The result display area 303 also includes a score 303b based on the comparison between the DLL reading information 52 regarding the original program 11A and the DLL reading information 52 regarding the judgment-target program 11B. This score 303b allows a user to easily know the similarity degree between the file group of the shared library called in the execution of the original program 11A and the file group of the shared library called in the execution of the judgment-target program 11B.

The result display area 303 also includes a score 303c based on the comparison between the process information 53 regarding the original program 11A and the process information 53 regarding the judgment-target program 11B. This score 303c allows a user to easily know the similarity degree between the process in the execution of the original program 11A and the process in the execution of the judgment-target program 11B.

The result display area 304 is an area in which a score 304a is displayed as to the cosine similarity based on the comparison between the API call information 51 regarding the original program 11A and the API call information 51 regarding the judgment-target program 11B. This score 304a allows a user to easily know the cosine similarity between the content of the API call in the execution of the original program 11A and the content of the API call in the execution of the judgment-target program 11B.

As described above, the information processing apparatus 1 executes the original program 11A under the system environment 200, and acquires API call information called in communication with the kernel 201 in terms of an API call type, the number of executions of the API call, or a call order of a first API call. The information processing apparatus 1 also executes the judgment-target program 11B under the system environment 200, and acquires API call information called in communication with the kernel 201 in terms of an API call type, the number of executions of the API call, or a call order of a first API call. Furthermore, the information processing apparatus 1 compares the API call information regarding the original program 11A the API call information regarding the judgment-target program 11B, and determines the similarity between the original program 11A and judgment-target program 11B based on a result of the comparison and outputs the determined similarity. Thus, a user is allowed to easily detect malware which may be one of a lot of various subspecies of malware created from the original program 11A without collecting all subspecies of malware as the original programs 11A.

Note that constituent elements of each apparatus illustrated in figures do not have to be physically configured as illustrated in the figures. That is, a specific configuration of each apparatus in terms of division or combination of elements is not limited to those illustrated in the figures, but all or part of the elements may be physically separated or combined in arbitrary units depending on various loads or usage situations.

Regarding various processing functions performed by the information processing apparatus 1, all or part of them may be executed on a CPU (or a microcomputer such as an MPU, an MCU (Micro Controller Unit), or the like). Regarding various processing functions, as a matter of course, all or part of them may be executed on a program interpreted and executed on a CPU (or a microcomputer such as an MPU, an MCU (Micro Controller Unit), or the like), or on wired logic hardware. Regarding various processing functions performed by the information processing apparatus 1, they may be executed by a plurality of computers in cooperation by using cloud computing.

Figure 8:
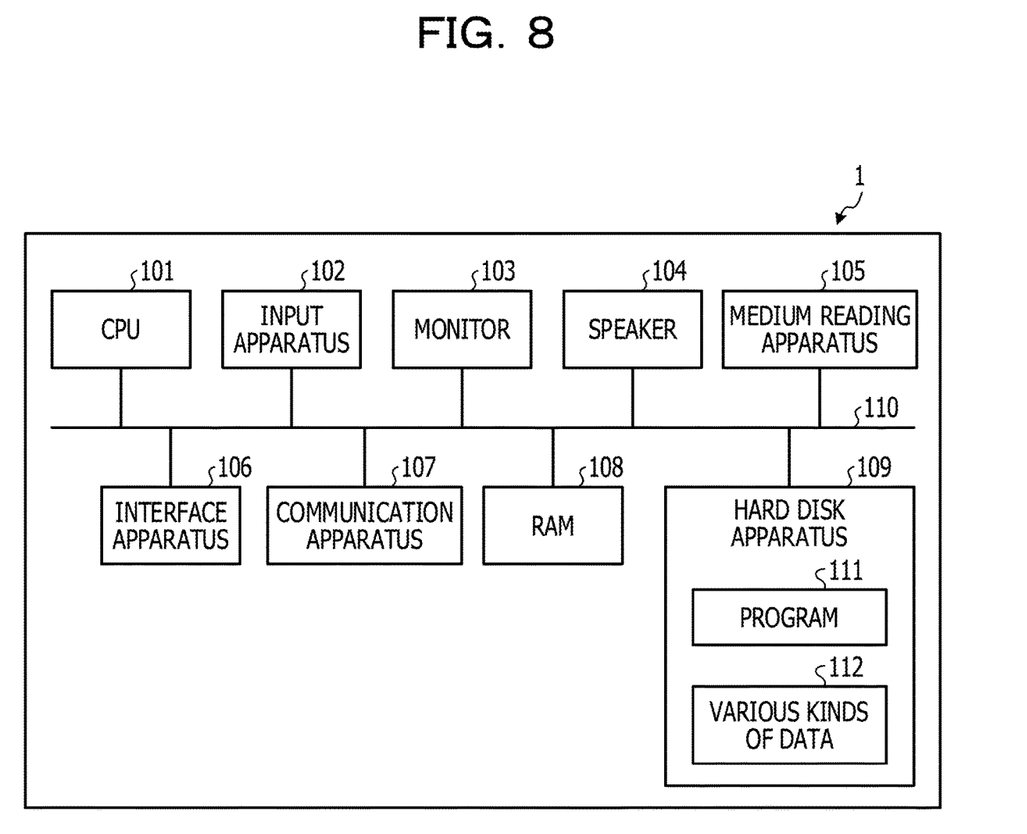
FIG. 8 is block diagram illustrating an example of a hardware configuration of an information processing apparatus according to an embodiment.

Note that various processes described above with reference to the embodiments may be realized by executing a program prepared in advance on a computer. Thus, next, an example of a computer (hardware) is described below that executes a program to realize functions similar to the functions realized in the embodiments described above. FIG. 8 is block diagram illustrating an example of a hardware configuration of the information processing apparatus 1 according to an embodiment.

As illustrated in FIG. 8, an information processing apparatus 1 is an apparatus configured to a CPU 101 configured to execute various operations and processes, an input apparatus 102 configured to accept data input, a monitor 103, and a speaker 104. The information processing apparatus 1 also includes a medium reading apparatus 105 configured to read out a program or the like from a storage medium, an interface apparatus 106 for coupling to various apparatuses, and a communication apparatus 107 for coupling to an external device to perform wireless or wired communication. The information processing apparatus 1 further includes a RAM 108 configured to temporarily store various kinds of information, and a hard disk apparatus 109. Each unit (101 to 109) in the information processing apparatus 1 is coupled to a bus 110.

The hard disk apparatus 109 stores a program 111 for executing various processes at the input unit 10, the execution unit 20, the judgment unit 30, and the output unit 40 described above with reference to the embodiments. The hard disk apparatus 109 also stores various kinds of data 112 to be referred to by the program 111. The input apparatus 102 accepts, for example, an input of operation information performed by an operator on the information processing apparatus 1. The monitor 103 displays, for example, various screens to be operated by an operator. The interface apparatus 106 is coupled, for example, to a printing apparatus or the like. The communication apparatus 107 is coupled to a communication network such as a LAN (Local Area Network) and thereby transmits and receives various kinds of information to and from an external device via the communication network.

The CPU 101 reads out the program 111 stored in the hard disk apparatus 109 and load the program 111 in the RAM 108, and the CPU 101 executes the program 111 loaded in the RAM 108 thereby achieving various processes. The program 111 may not be stored in the hard disk apparatus 109. For example, the information processing apparatus 1 may read out the program 111 stored in a readable storage medium and may execute the program 111. As for the storage medium readable by the information processing apparatus 1, for example, a CD-ROM or DVD disk, a portable storage medium such as USB (Universal Serial Bus) memory or a storage medium of a similar type, a semiconductor memory such as a flash memory, a hard disk drive or the like may be employed. The program 111 may be stored in an apparatus coupled to a public line, the Internet, a LAN, or the like, and the information processing apparatus 1 may read out the program 111 from the apparatus and execute the program 111.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes an information processing apparatus to execute a process, the process comprising:
    executing a first program using a system including a kernel of an operating system (OS), the first program being a target for determining whether the target is a malware;
    acquiring first information regarding a first Application Programming interface (API) call in communication with the kernel in the execution of the first program, the first information including a first type of the first API call, a first number of executions of the first API call, a first call order of the first API call, and a first return of the first API call;
    executing each of a plurality of second programs using the system, each of the plurality of second programs being a software which performs fraudulent processing by the malware;
    acquiring second information regarding a second API call in communication with the kernel in the execution of the each of the plurality of second programs, the second information including a second type of the second API call, a second number of executions of the second API call, a second call order of the second API call, and a second return of the second API call;
    judging a first similarity between the first program and the each of the plurality of second programs by comparing the first type with the second type;
    judging a second similarity between the first program and the each of the plurality of second programs by comparing the first number of executions with the second number of executions;
    judging a third similarity between the first program and the each of the plurality of second programs by comparing the first call order with the second call order;
    judging a fourth similarity between the first program and each of the plurality of second programs by comparing the first return with the second return; and
    outputting, by judging results of the first similarity, second similarity, the third similarity, and the fourth similarity, a program which is similar to the first program, among the plurality of second programs.

2. The non-transitory computer-readable storage medium according to claim 1, wherein
    the judging the first similarity includes judging a similarity between an N-gram model in which the first API calls are described in a call order based on the first information and an N-gram model in which the second API calls are described in a call order based on the second information.

3. The non-transitory computer-readable storage medium according to claim 1, wherein
    the judging the first similarity includes judging a cosine similarity between a first vector based on the first information and a second vector based on the second information.

4. An information processing apparatus comprising:
    a memory; and
    a processor coupled to the memory and configured to:
    execute a first program using a system including a kernel of an operating system (OS), the first program being a target for determining whether the target is a malware;
    acquire first information regarding a first Application Programming interface (API) call in communication with the kernel in the execution of the first program, the first information including a first type of the first API call, a first number of executions of the first API call, a first call order of the first API call, and a first return of the first API call;
    execute each of a plurality of second programs using the system, each of the plurality of second programs being a software which performs fraudulent processing by the malware;
    acquire second information regarding a second API call in communication with the kernel in the execution of the each of the plurality of second programs, the second information including a second type of the second API call, a second number of executions of the second API call, a second call order of the second API call, and a second return of the second API call;
    judge a first similarity between the first program and the each of the plurality of second programs by comparing the first type with the second type;
    judge a second similarity between the first program and the each of the plurality of second programs by comparing the first number of executions with the second number of executions;
    judge a third similarity between the first program and the each of the plurality of second programs by comparing the first call order with the second call order;
    judge a fourth similarity between the first program and the each of the plurality of second programs by comparing the first return with the second return; and
    output, by judging results of the first similarity, second similarity, the third similarity, and the fourth similarity, a program which is similar to the first program, among the plurality of second programs.

5. The information processing apparatus according to claim 4,
wherein the processor is configured to judge a similarity between an N-gram model in which the first API calls are described in a call order based on the first information and an N-gram model in which the second API calls are described in a call order based on the second information, as the first similarity.

6. The information processing apparatus according to claim 4, wherein
the processor is configured to judge a cosine similarity between a first vector based on the first information and a second vector based on the second information, as the first similarity.

7. A method executed by a computer, the method comprising:
executing a first program using a system including a kernel of an operating system (OS), the first program being a target for determining whether the target is a malware;
acquiring first information regarding a first Application Programming interface (API) call in communication with the kernel in the execution of the first program, the first information including a first type of the first API call, a first number of executions of the first API call, a first call order of the first API call, and a first return of the first API call;
executing each of a plurality of second programs using the system, each of the plurality of second programs being a software which performs fraudulent processing by the malware;
acquiring second information regarding a second API call in communication with the kernel in the execution of the each of the plurality of second programs, the second information including a second type of the second API call, a second number of executions of the second API call, a second call order of the second API call, and a second return of the second API call;
judging a first similarity between the first program and the each of the plurality of second programs by comparing the first type with the second type;
judging a second similarity between the first program and the each of the plurality of second programs by comparing the first number of executions with the second number of executions;
judging a third similarity between the first program and the each of the plurality of second programs by comparing the first call order with the second call order;
judging a fourth similarity between the first program and the each of the plurality of second programs by comparing the first return with the second return; and
outputting, by judging results of the first similarity, second similarity, the third similarity, and the fourth similarity, a program which is similar to the first program, among the plurality of second programs.

8. The method according to claim 7, wherein
the judging the first similarity includes judging a similarity between an N-gram model in which the first API calls are described in a call order based on the first information and an N-gram model in which the second API calls are described in a call order based on the second information.

9. The method according to claim 7, wherein
the judging the first similarity includes judging a cosine similarity between a first vector based on the first information and a second vector based on the second information.

* * * * *